— 3,752,844
Patented Aug. 14, 1973

3,752,844
ESTERS OF INDENYL ALKANOIC ACIDS
Karl Pfister, Westfield, Meyer Sletzinger, North Plainfield, and David F. Hinkley, Plainfield, N.J., assignors to Merck & Co., Inc., Rahway, N.J.
No Drawing. Continuation of abandoned application Ser. No. 26,438, Apr. 7, 1970. This application Oct. 1, 1971, Ser. No. 185,873
Int. Cl. C07c 147/14
U.S. Cl. 260—470                                                    3 Claims

ABSTRACT OF THE DISCLOSURE

New acyloxyalkyl esters of indenyl acetic acids. These compounds are useful as in vivo cleavable, long-lasting anti-inflammatory and analgesic agents. Also included are processes for preparing these compounds.

---

This application is a continuation of U.S. Ser. No. 26,438, filed Apr. 7, 1970, which was abandoned Dec. 1, 1971.

This invention relates to new substituted indenyl acetic acid esters and processes for producing the same. More specifically, this invention relates to compounds having the following general formula:

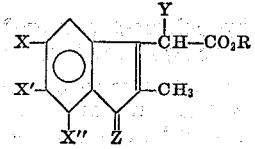

wherein:

X is loweralkoxy or halo;
X' is hydrogen or halo;
X" is hydrogen or halo;
Y is hydrogen or loweralkyl;
Z is p-methylsulfinylbenzylidenyl; and
R is any acyloxyalkyl function of the formula

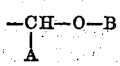

wherein A is hydrogen, loweralkyl, haloloweralkyl, or aryl; and B is an acyl group.

In the most preferred compounds of this invention X is halo, X' is hydrogen, Y is hydrogen, Z is p-methylsulfinylbenzylidenyl; A is hydrogen or loweralkyl; and B is acetyl, pivaloyl or benzoyl.

Representative compounds of this invention are as follows:

Pivaloyloxymethyl 5-fluoro-2-methyl-1-(p-methylsulfinylbenzylidene)-3-indenyl acetate;
Acetoxymethyl 5,7-difluoro-2-methyl-1-(p-methylsulfinylbenzylidene)-3-indenyl acetate;
Acetoxymethyl 5-fluoro-2-methyl-1-(p-methylsulfinylbenzylidene)-3-indenyl acetate;
Benzoyloxymethyl 6-fluoro-5-methoxy-2-methyl-3-indenyl acetate;
Benzoyloxymethyl 5-fluoro-2-methyl-1-(p-methylsulfinylbenzylidene)-3-indenyl acetate;
Actoxy-α-ethyl 5-fluoro-2-methyl-1-(p-methylsulfinylbenzylidene)-3-indenyl acetate;
Acetoxy-α-phenyl 5,7-difluoro-2-methyl-1-(p-methylsulfinylbenzylidene)-3-indenyl acetate;
Acetoxy-α-phenyl 5-fluoro-2-methyl-1-(p-methylsulfinylbenzylidene)-3-indenyl acetate;
Pivaloyloxymethyl 5-fluoro-2-methyl-1-(p-methylsulfinylbenzylidene)-3-indenyl-α-propionate;
Acetoxymethyl 6-fluoro-5-methoxy-2-methyl-1-(p-methylsulfinylbenzylidene)-3-indenyl-α-propionate;
Acetoxymethyl 5-fluoro-2-methyl-1-(p-methylsulfinylbenzylidene)-3-indenyl-α-propionate;
Benzoyloxymethyl 5-fluoro-2-methyl-1-(p-methylsulfinylbenzylidene)-3-indenyl-α-propionate;
Acetoxy-α-ethyl 5,7-difluoro-2-methyl-1-(p-methylsulfinylbenzylidene)-3-indenyl-α-propionate;
Acetoxy-α-ethyl 5-fluoro-2-methyl-1-(p-methylsulfinylbenzylidene)-3-indenyl-α-propionate; and
Acetoxy-α-phenyl 5-fluoro-2-methyl-1-(p-methylsulfinylbenzylidene)-3-indenyl-α-propionate.

This invention also relates to a method of treating inflammation in patients using a compound of the above formula, particularly an especially preferred compound as an active ingredient in the pharmaceutical compositions of this invention.

The compounds of the instant invention can be used to treat inflammation by reducing inflammation and relieving pain in such diseases as rheumatoid arthritis, osteoarthritis, gout, infections arthritis and rheumatic fever. The compounds of the instant invention are particularly useful because they are cleavable in vivo over an extended period of time and resultingly, are long-lasting anti-inflammatory agents.

The compounds of Formula I also have anti-pyretic and analgesic activity and would be administered and used in the same manner and in the same dosage ranges as if they were being used to treat inflammation as discussed further on.

The treatment of inflammation in accordance with the method of the present invention is accomplished by topically, orally, rectally or parenterally administering to patients a composition of a compound of Formula I, particularly the especially preferred compounds in a non-toxic pharmaceutically acceptable carrier.

The non-toxic pharmaceutical carrier may be, for example, either a solid or a liquid. Exemplary of solid carriers are lactose, corn starch, gelatin, talc, sterotix, stearic acid, magnesium stearate, terra alba, sucrose, agar, pectin, Cab-O-Sil, and acacia. Expemplary of liquid carriers are peanut oil, olive oil, sesame oil and water. Similarly, the carrier or diluent may include a time delay material such as glyceryl monostearate or glyceryl distearate alone or with a wax.

Several pharmaceutical forms of the therapeutically useful compositions can be used. For example, if a solid carrier is used, the compositions may take the form of tablets, capsules, powders, troches or lozenges, prepared by standard pharmaceutical techniques. If a liquid carrier is used, the preparation may be in the form of a soft gelatin capsule, a syrup, an aqueous solution or a liquid suspension. Suppositories may be prepared in a conventional manner by mixing the compounds of this invention with a suitable non-irritating excipient which is solid at room temperature, but liquid at the rectal temperature. Such materials are cocoa butter and polyethylene glycol. Gels and lotions for topical application may be prepared in conventional manners.

The active compounds of Formula I and of the compositions of this invention are administered in an amount sufficient to treat inflammation, that is to reduce inflammation. Advantageously, the compositions will contain the active ingredient, namely, the compounds of Formula I in an amount of from about 0.1 mg. to 50 mg. per kg. body weight per day (5 mg. to 3.5 g. per patient per day), preferably from about 1 mg. to 15 mg./kg. body weight per day (50 mg. to 1 g. per patient per day).

The method of treatment of this invention comprises administering to a patient (animal or human), a compound of Formula I, particularly an especially preferred compound admixed with a non-toxic pharmaceutical carrier such as exemplified above. The compounds of Formula I and particularly the especially preferred compounds will be administered in an amount of from 0.1 mg. to 50 mg./kg. body weight per day, preferably from about 1 mg. to about 15 mg. per kilogram body weight per day. The most rapid and effective anti-inflammatory effect is obtained from oral administration of a daily dosage of from about 1 to 15 mg./kg./day. It should be understood, however, that although preferred dosage ranges are given, the dose level for any particular patient depends upon the activity of the specific compound employed. Also many other factors that modify the actions of drugs will be taken into account by those skilled in the art in the therapeutic use of medicinal agents, particularly, those of Formula I, for example, age, body weight, sex, diet, time of administration, route of administration, rate of excretion, drug combination, reaction sensitivities and severity of the particular disease.

The compounds of the instant invention may be prepared by several methods. For example the sodium salt of the preferred indenyl acetic acids may be reacted with the desired acyloxyalkyl halide. Alternatively, the free acid or the silver salt may be reacted with the desired acyloxyalkyl halide or anhydride. As a further alternative, the indene acid chloride may be reacted with p-formaldehyde to produce the chloromethyl derivative of the indenyl acetic acid. This compound is then reacted with an acid having the desired acyl group. These and other procedures for preparing the compounds of this invention will be apparent from the following examples:

EXAMPLE 1

Pivaloyloxymethyl 5,7-difluoro-2-methyl-1-(p-methylsulfinylbenzylidene)-3-indenyl acetate To 0.01 mole of pivaloyloxymethyl 5,7 - difluoro - 2 - methyl-3-indenyl acetate and 0.01 mole of p-methylthiobenzaldehyde is added 2 equivalents of 25% methanolic sodium methoxide. The mixture is refluxed for 2 hours, cooled and exactly neutralized with acetic acid. A solution of 0.01 mole of sodium periodate in 30 ml. of water and enough acetone to effect solution is added. The solution is stirred overnight at room temperature and filtered. The filtrate is concentrated and diluted with cold water to precipitate the product.

EXAMPLE 2

Acetoxymethyl 6-fluoro-5-methoxy-2-methyl-1-(p-methylsulfinylbenzylidene)-3-indenyl acetate To 0.1 mole of the sodium salt of 6-fluoro-5-methoxy-2-methyl-1-(p-methylsulfinylbenzylidene)-3-indenyl acetic acid in a half-liter of acetone is added 0.1 mole of chloromethyl acetate and a solution of 1.0 g. of sodium iodide in 12 ml. of water. The mixture is stirred and the solution then slowly diluted with a liter of water to precipitate the acetoxymethyl derivative.

EXAMPLE 3

Benzoyloxymethyl 5,7-difluoro-2-methyl-1-(p-methylsulfinylbenzylidene)-3-indenyl acetate To 0.05 mole of the sodium salt of 5,7-difluoro-2-methyl - 1 - (p-methylsulfinylbenzylidene)-3-indenyl acetic acid in 250 ml. of benzene is added 0.05 mole of bromomethylbenzoate and a solution of 0.5 g. of sodium iodide in 7 ml. of water. The mixture is stirred and the solution then slowly diluted with a liter of water to precipitate the benzoyloxymethyl derivative of 5,7-difluoro-2-methyl-1-(p-methylsulfinylbenzylidene)-3-indenyl acetic acid.

EXAMPLE 4

Acetoxy-α-ethyl 6-fluoro-5-methoxy-2-methyl-1-(p-methylsulfinylbenzylidene)-3-indenyl acetate To 0.1 mole of the sodium salt of 6-fluoro-5-methoxy-2-methyl-1-(p-methylsulfinylbenzylidene)-3-indenyl acetic acid in 100 ml. of t-butanol is added 0.1 mole of α-chloroethyl acetate and a solution of 1.0 g. of sodium iodide in 12 ml. of water. The mixture is stirred overnight and the solution then slowly diluted with 2 liters of water to precipitate the acetoxy-α-ethyl derivative.

EXAMPLE 5

Pivaloyloxymethyl 5,7-difluoro-2-methyl-1-(p-methylsulfinylbenzylidene)-3-indenyl acetate To 0.05 mole of 5,7-difluoro-2-methyl-1-(p-methylsulfinylbenzylidene)-3-indenyl acetic acid is added 0.25 mole of pyridine and 0.05 mole of bromomethylpivalate with cooling. The mixture is stirred and then poured into several volumes of ice water to precipitate the mixed acylal, the pivaloyloxymethyl derivative of 5,6-difluoro-2-methyl-1-(p-methylsulfinylbenzylidene)-3-indenyl acetic acid.

EXAMPLE 6

Pivaloyloxymethyl 5,7-difluoro-2-methyl-1-(p-methylsulfinylbenzylidene)-3-indenyl acetate To 0.1 mole of 5,7-difluoro-2-methyl-1-(p-methylsulfinylbenzylidene)-3-indolyl acetic acid is added slowly 200 ml. of dimethylformamide containing 0.1 mole of sodium hydride at 20° C., further 0.1 mole of chloromethylpivalate is added slowly with cooling. The mixture is stirred briefly at 10° C., and then drowned in water to precipitate the mixed acylal, the pivaloyloxymethyl derivative.

EXAMPLE 7

Pivaloyloxymethyl 6-fluoro-5-methoxy-2-methyl-1-(p-methylsulfinylbenzylidene)-3-indenyl acetate To 0.1 mole of the chloromethyl derivative of 6-fluoro-5-methoxy-2-methyl-1-(p-methylsulfinylbenzylidene) - 3-indenyl acetic acid in 250 ml. of ether is added 0.1 mole of the silver salt of pivalic acid. The mixture is stirred overnight and then filtered to remove the silver chloride. Stirring is continued overnight. Concentration gives a heavy slurry of the pivaloyloxymethyl derivative.

EXAMPLE 8

Pivaloyloxymethyl 5,6-difluoro-2-methyl-1-(p-methylsulfinylbenzylidene)-3-indenyl acetate To 0.1 mole of the 5,7-difluoro-2-methyl-1-(p-methylsulfinylbenzylidene)-3-indenyl acetic acid mixed anhydride in 500 ml. of ether is added 3 g. of paraformaldehyde and a drop of sulfuric acid. The mixture is stirred for 48 hours and then concentrated to a heavy slurry and filtered. Washing and drying gives the pivaloyloxymethyl derivative of 5,7 - difluoro - 2 - methyl - 1 - (p-methylsulfinylbenzylidene)-3-indenyl acetic acid.

EXAMPLE 9

Acetoxymethyl 5,7-difluoro-2-methyl-1-(p-methylsulfinylbenzylidene)-3-indenyl acetate To 0.1 mole of the silver salt of 5,7-difluoro-2-methyl-1-(p-methyluslfinylbenzylidene)-3-indenyl acetic acid suspended in 500 ml. of t-butanol is added 0.1 mole (15.3 g.) of bromomethyl acetate and 10 ml. of triethylamine. The mixture is stirred several hours and then filtered. The filtrate is poured into cold, dilute acetic acid to precipitate the acetoxymethyl derivative.

EXAMPLE 10

Acetoxymethyl 6-fluoro-5-methoxy-2-methyl-1-(p-methylsulfinylbenzylidene)-3-indenyl acetate To 0.1 mole of 5,7-difluoro-2-methyl-1-(p-methylsulfinylbenzylidene)-3-indenyl acetic acid is added an excess of formalehyde diacetate. The mixture is heated at 40° C. in vacuo while acetic acid slowly evolves. The reaction mixture is then diluted with water to decompose the excess diacetate and precipitate the acetoxymethyl derivative.

EXAMPLE 11

Pivaloyloxymethyl 5-fluoro-2-methyl-1-(p-methylsulfinylbenzylidene)-3-indenyl acetate To 0.5 mole of sodium 5-fluoro-2-methyl-1-(p-methylsulfinylbenzylidene)-3-indenyl acetate in 250 ml. of acetone is added 0.5 g. of sodium iodide in 5 ml. of water and 0.05 mole of chloromethyl pivalate. The mixture is stirred 12 hours and poured into ice water to precipitate the pivaloyloxymethyl derivative.

EXAMPLE 12

Pivaloyloxymethyl 5-fluoro-2-methyl-1-(p-methylsulfinylbenzylidene)-3-indenyl acetate To 0.05 mole of 5-fluoro-2-methyl-1-(p-methylsulfinylbenzylidene)-3-indenyl acetate is added 0.25 mole of pyridine and 0.05 mole of bromomethylpivalate with cooling. The mixture is stirred and then poured into several volumes of ice water to precipitate the pivaloyloxymethyl derivative of 5-fluoro-2-methyl-1-(p-methylsulfinylbenzylidene)-3-indenyl acetic acid.

EXAMPLE 13

Pivaloyloxymethyl 5-fluoro-2-methyl-1-(p-methylsulfinylbenzylidene)-3-indenyl acetate To 0.1 mole of 5-fluoro-2-methyl-1-(p-methylsulfinylbenzylidene)-3-indenyl acetate is added slowly 100 ml. of dimethylformamide containing 0.1 mole of sodium hydride at 20° C., further 0.1 mole of chloromethyl pivalate is added slowly with cooling. The mixture is stirred briefly at 10° C., and then drowned in water to precipitate the mixed acylal, the pivaloyloxymethyl derivative.

EXAMPLE 14

Acetoxymethyl 5-fluoro-2-methyl-1-(p-methylsulfinylbenzylidene)-3-indenyl acetate To 0.1 mole (46.5 g.) of the silver salt of 5-fluoro-2-methyl-1-(p-methylsulfinylbenzylidene)-3-indenyl acetate suspended in 500 ml. of t-butanol is added 0.1 mole (15.3 g.) of bromomethyl acetate and 10 ml. of triethylamine. The mixture is stirred several hours and then filtered. The filtrate is poured into cold, dilute acetic acid to precipitate the acetoxymethyl derivative.

EXAMPLE 15

Acetoxymethyl 5-fluoro-2-methyl-1-(p-methylsulfinylbenzylidene)-3-indenyl acetate To 0.1 mole of 1 - (p - methylsulfinylbenzylidene)-2-methyl - 5 - fluoro-3-indenyl acetic acid is added an excess of formaldehyde diacetate. The mixture is heated at 40° C. in vacuo while acetic acid slowly evolves. The reaction mixture is then diluted with water to decompose the excess diacetate and precipitate the acetoxymethyl derivative.

EXAMPLE 16

Benzoyloxymethyl 5-fluoro-2-methyl-1-(p-methylsulfinylbenzylidene)-3-indenyl acetate To 0.05 mole (17.9 g.) of 1-(p-methylsulfinylbenzylidene)-2-methyl-5-fluoro-3-indenyl acetic acid in 250 ml. of acetone is added 0.25 mole of pyridine and 0.05 mole of bromomethylbenzoate with cooling. The mixture is stirred and then poured into several volumes of ice water to precipitate the benzoyloxymethyl derivative.

EXAMPLE 17

Acetoxymethyl 5-fluoro-2-methyl-1-(p-methylsulfinylbenzylidene)-3-indenyl acetate To 0.1 mole of 1 - (p - methylsulfinylbenzylidene)-2-methyl-5-fluoro-3-indenyl acetic acid is added slowly 200 ml. of dimethylformamide containing 0.1 mole of sodium hydride at 20° C., further 0.1 mole of chloromethyl acetate is added slowly with cooling. The mixture is stirred briefly at 10° C. and then drowned in water to precipitate the mixed acylal, the acetoxymethyl derivative.

EXAMPLE 18

Acetoxy-α-ethyl 5-fluoro-2-methyl-1-(p-methylsulfinylbenzylidene)-3-indenyl acetate To 0.1 mole of the α-chloroethyl derivative of 1-(p-methylsulfinylbenzylidene)-2-methyl-5-fluoro - 3 - indenyl acetic acid in 250 ml. of ether is added 0.1 mole of the silver salt of acetic acid. The mixture is stirred overnight and then filtered to remove the silver chloride. Stirring is continued overnight. Concentration gives a heavy slurry of the acetoxy-α-ethyl derivative.

EXAMPLE 19

Benzoyloxymethyl 5-fluoro-2-methyl-1-(p-methylsulfinylbenzylidene)-3-indenyl acetate To 0.1 mole of the 1-(p-methylsulfinylbenzylidene)-2-methyl-5-fluoro-3-indenyl acetic acid mixed anhydride in 500 ml. of ether is added 3 g. of paraformaldehyde and a drop of sulfuric acid. The mixture is stirred for 48 hours and then concentrated to a heavy slurry and filtered. Washing and drying gives the benzoyloxymethyl derivative.

EXAMPLE 20

Acetoxy-α-ethyl 5-fluoro-2-methyl-1-(p-methylsulfinylbenzylidene)-3-indenyl acetate To 0.1 mole of the acetoxy-α-ethyl derivative of 1-(p-methylsulfinylbenzylidene)-2-methyl-5-fluoro - 3 - indenyl acetic acid in 100 ml. of dimethylformamide aged with 0.1 mole of sodium hydride at 20° C. to cessation of hydrogen evolution is slowly added 0.1 mole of p-chlorobenzoylchloride. The mixture is stirred briefly and then concentrated in vacuo to small volume. Dilution with water precipitates the acetoxy-α-ethyl derivative.

EXAMPLE 21

Acetoxy-α-benzyl 5-fluoro-2-methyl-1-(p-methylsulfinylbenzylidene)-3-indenyl acetate To 0.1 mole (46.5 g.) of the silver salt of 1-(p-methylsulfinylbenzylidene)-2-methyl-5-fluoro-3 - indenyl acetic acid suspended in 500 ml. of t-butanol is added 0.1 mole (15.3 g.) of α-bromobenzyl acetate and 10 ml. of triethylamine. The mixture is stirred several hours and then filtered. The filtrate is poured into cold, dilute acetic acid to precipitate the acetoxy-α-benzyl derivative.

EXAMPLE 22

A mixture of 250 parts of pivaloyloxymethyl 6-fluoro-5 - methoxy - 2 - methyl - 1 - (p - methylsulfinylbenzylidene)-3-indenyl acetate and 25 parts of lactose is granulated with suitable water and to this is added 100 parts of maize starch. The mass is passed through a 16-mesh screen. The granules are dried at a temperature below 60° C. The dry granules are passed through a 16-mesh screen and mixed with 3.8 parts of magnesium stearate. They are then compressed into tablets suitable for oral administration as an anti-inflammatory, according to the method of this invention.

EXAMPLE 23

A mixture of 50 parts of acetoxymethyl 5,6-difluoro-2-methyl-1-(p-methylsulfinylbenzylidene) - 3 - indenyl acetate, 3 parts of the calcium salt of lignin sulfonic acid, and 237 parts of water is ball-milled until the size of substantially all of the particles of acetoxymethyl 1-cinnamoyl-5-methoxy-2-methyl-3-indolyl acetate is less than 10 microns. The suspension is diluted with a solution containing 3 parts of sodium carboxymethylcellulose and 0.9 part of the butyl ester of p-hydroxybenzoic acid in 300 parts of water. There is thus obtained an aqueous suspension suitable for oral administration for therapeutic purposes.

EXAMPLE 24

A mixture of 250 parts of benzoyloxymethyl 5-fluoro-2-methyl-1-(p-methylsulfinylbenzylidene)-3-indenyl acetate, 200 parts of maize starch and 30 parts of alginic acid is mixed with a sufficient quantity of a 10% aqueous paste of maize starch and granulated. The granules are dried in a current of warm air and the dry granules are then passed through a 16-mesh screen, mixed with 6 parts of magnesium stearate and compressed into tablet form to obtain tablets suitable for oral administration.

EXAMPLE 25

(A) A mixture of 500 parts of pivaloyloxymethyl 5-fluoro-2-methyl-1-(p-methylsulfinylbenzylidene)-3-indenyl acetate, 60 parts of maize starch and 20 parts of gum acacia is granulated with a sufficient quantity of water. The mass is passed through a 12-mesh screen and the granules are dried in a current of warm air. The dry granules are passed through a 16-mesh screen, mixed with 5 parts of magnesium stearate and compressed into tablet form suitable for oral administration.

(B) The other acyloxyalkyl esters disclosed herein may be formulated in accordance with the above procedures.

What is claimed is:

1. A compound of the formula:

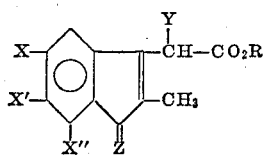

wherein:

X is loweralkoxy or halo;
X' is hydrogen or halo;
X" is hydrogen or halo;
Y is hydrogen or loweralkyl;
Z is p-methylsulfinylbenzylidenyl; and
R is any acyloxyalkyl function of the formula

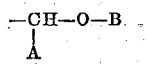

wherein A is hydrogen, loweralkyl, or benzyl; and B is alkanoyl or benzoyl.

2. A compound as in claim 1 wherein X is halo, X' is hydrogen, X" is hydrogen, Y is hydrogen, Z is p-methylsulfinylbenzylidenyl, A is hydrogen or loweralkyl, and B is acetyl, pivaloyl or benzoyl.

3. A compound as in claim 2 wherein X is fluoro, A is hydrogen and B is acetyl or pivaloyl.

References Cited
UNITED STATES PATENTS 3,312,730   4/1967   Winter _____ 260—520

LORRAINE A. WEINBERGER, Primary Examiner

J. F. TERAPANE, Assistant Examiner

U.S. Cl. X.R.

424—308